United States Patent [19]

Takeuchi et al.

[11] 4,218,352

[45] Aug. 19, 1980

[54] STABILIZED HALOGEN-CONTAINING RESIN COMPOSITIONS

[75] Inventors: Kouji Takeuchi; Masao Nakamura, both of Yokohama; Nobuyoshi Kitamura, Sagamihara; Shohachi Matsuura, Kawasaki, all of Japan

[73] Assignee: Ajinomoto Company, Incorporated, Tokyo, Japan

[21] Appl. No.: 956,363

[22] Filed: Oct. 31, 1978

[30] Foreign Application Priority Data

Nov. 15, 1977 [JP] Japan .................................. 52-136858
Feb. 17, 1978 [JP] Japan .................................. 53-17182

[51] Int. Cl.$^2$ .............................................. C08K 5/11
[52] U.S. Cl. ........................ 260/23 XA; 260/45.85 R; 260/45.85 E; 260/45.95 L; 260/45.85 N
[58] Field of Search .................. 260/23 XA, 45.85 R, 260/45.95 L, 45.85 E, 45.85 N

[56] References Cited

U.S. PATENT DOCUMENTS

| | | | |
|---|---|---|---|
| 2,711,401 | 6/1955 | Lally | 260/23 XA |
| 3,072,591 | 1/1963 | Fath | 260/23 XA |
| 3,764,571 | 10/1973 | Jennings et al. | 260/23 XA |
| 3,928,267 | 12/1975 | Rhodes et al. | 260/23 XA |
| 3,953,358 | 4/1976 | Sjogreen | 260/23 XA |

*Primary Examiner*—V. P. Hoke
*Attorney, Agent, or Firm*—Oblon, Fisher, Spivak, McClelland & Maier

[57] ABSTRACT

A molten material is prepared by heating a mixture of (A) a polyhydric alcohol containing a neopentyl structure such as pentaerythritol, dipentaerythritol or tripentaerythritol which is less compatible with a halogen-containing resin and (B) a partial ester of said polyhydric alcohol and a carboxyl group-containing compound which has good compatibility with the halogen-containing resin to the molten state. The molten material functions as a stabilizer assistant which markedly increases the thermal stabilizing effect of divalent metal stabilizers for the halogen-containing resin.

15 Claims, No Drawings

STABILIZED HALOGEN-CONTAINING RESIN COMPOSITIONS

BACKGROUND OF THE INVENTION

Field of the Invention

This invention relates to halogen-containing resin compositions having good processing property and excellent long-term thermal stability.

It is well-known that when halogen-containing resins, including polyvinyl halide and halogenated polyolefin, are subjected to sunlight or to elevated temperature during or after compounding or processing, they can undergo a marked change in color and transparency and become brittle principally because of the decomposition of the resin which releases hydrogen halide. Various stabilizers have been proposed for preventing or reducing such deterioration.

Although zinc, lead, alkaline earth metal and organo tin stabilizers have been mainly employed, each of these stabilizers is not sufficient in long-term thermal stability. More particularly zinc and alkaline earth metal stabilizers cause initial rapid discoloration at the normal processing temperatures of the halogen-containing resin. Thus, improvement in thermal stability has been eagerly sought.

In order to improve the thermal stability of the zinc and alkaline earth metal stabilizers, an attempt has been made to incorporate a polyhydric alcohol such as pentaerythritol, dipentaerythritol or tripentaerythritol containing a neopentyl type of skeleton in the molecule in a halogen-containing resin together with said divalent metal stabilizer. However, the product finished therefrom has insufficient impact strength because said neopentyl type polyhydric alcohol has a higher melting point than the processing temperature of the halogen-containing resin and is less compatible with the halogen-containing resin.

It has also been proposed to employ a mixture of two or more different kinds of neopentyl type polyhydric alcohols as a molten material whose melting point is below the processing temperature of polyvinyl chloride in combination with zinc and alkaline earth metal stabilizers, as disclosed in Japanese Patent Application No. 1296/1974. Even when the molten polyhydric alcohol mixtures having depressed melting points have been incorporated in polyvinyl chloride, satisfactory compatibility effects cannot be achieved, since polyhydric alcohol mixtures are still dispersed in the finished polyvinyl chloride sheet in the form of such large particles that may be easily observed by the naked eye.

It is an object of the present invention to provide an improved thermal stabilizer composition and an improved thermally stabilized compositions of halogen-containing resins.

An another object of the present invention is to provide certain molten material containing neopentyl type polyhydric alcohol wherein the neopentyl type polyhydric alcohol is compatible with halogen-containing resins and is valuable in enhancing the thermal stabilizing effect of the divalent metal stabilizers for halogen-containing resins.

SUMMARY OF INVENTION

It has now been found that if neopentyl type polyhydric alcohol is heated in admixture with its partial ester at an elevated temperature sufficient to melt the mixture, the resultant molten material is compatible with a halogen-containing resin.

It has further been found that excellent thermally stabilized halogen-containing resin compositions may be prepared by adding a molten material derived from a mixture of (A) a neopentyl type polyhydric alcohol and (B) a partial ester of said neopentyl type polyhydric alcohol and a carboxyl group-containing compound to a halogen-containing resin together with a divalent metal stabilizer such as zinc or an alkaline earth metal stabilizer.

DESCRIPTION OF THE PREFERRED EMBODIMENTS

A halogen-containing resin composition in accordance with this invention comprises a halogen-containing resin, a stabilizer of a divalent metal compound selected from the group consisting of zinc compounds and alkaline earth metal compounds, and a stabilizer assistant of a molten material derived from a mixture of (A) a polyhydric alcohol containing a neopentyl type of skeleton in the molecule and (B) a partial ester of said polyhydric alcohol and a compound having at least one free carboxyl group, said partial ester having at least one free hydroxyl group in the molecule and said compound being an aliphatic saturated or unsaturated monocarboxylic acid having 1 to 30 carbon atoms, an aliphatic dicarboxylic acid having 3 to 16 carbon atoms, an aromatic carboxylic acid, an amino acid, pyroglutamic acid, a hydroxycarboxylic acid having 2 to 10 carbon atoms and their derivatives having at least one carboxyl group in the molecule.

With regard to the temperature at which the molten material derived from a mixture of (A) a neopentyl type polyhydric alcohol and (B) a partial ester of said neopentyl type polyhydric alcohol melts completely to give a clear viscous liquid, the temperature may be varied widely depending on the individual (A) and (B) components selected which are to melt when mixed, the proportion of (A) component to (B) component and the degree of esterification of the (B) component. However, it is not necessary to prepare a molten material which melts completely below the processing temperature of the halogen-containing resin selected. Even though the molten material whose melting point exceeds the processing temperature of the halogen-containing resins has been prepared, it may nevertheless be employed conveniently because of its good compatibility with the halogen-containing resins. This is the outstanding feature of the molten material of the present invention.

The preparation of the molten material from a mixture of (A) a neopentyl type polyhydric alcohol and (B) a partial ester of said neopentyl type polyhydric alcohol may be carried out by heating said mixture at an elevated temperature, usually at temperatures between 200° C. and 250° C., until a clear viscous liquid is formed. The viscous liquid may be permitted to solidify and then may be pulverized to a very fine particle size for blending with a halogen-containing resin. A molten material whose melting point lies in the range of 180° to 220° C. is preferably employed.

If a mixture of (A) a neopentyl type polyhydric alcohol and (B) a partial ester of said neopentyl type polyhydric alcohol is incorporated in halogen-containing resins as it is, then no appreciable improved result of compatibility with halogen-containing resin and thermal stability can be obtained.

Suitable examples of (A) neopentyl type polyhydric alcohols which may be employed as one constituent of the molten mixture in the present invention include pentaerythritol, dipentaerythritol, tripentaerythritol and their mixtures.

The carboxyl group-containing compound which may be used for the preparation of the partial ester of the above neopentyl type polyhydric alcohol which is another constituent of the molten mixture of the present invention may be any compound having at least one carboxyl group in the molecule, for example, aliphatic saturated or unsaturated monocarboxylic acids having 1 to 30 carbon atoms, aliphatic dicarboxylic acids having 3 to 16 carbon atoms, aromatic carboxylic acids, amino acids, pyroglutamic acid, hydroxycarboxylic acid having 2 to 10 carbon atoms and derivatives thereof having at least one carboxyl group. Representative examples of the respective carboxyl group-containing compounds are the following. Aliphatic saturated or unsaturated monocarboxylic acids include formic acid, acetic acid, propionic acid, n-butyric acid, isobutyric acid, valeric acid, caproic acid, enanthic acid, caprylic acid, pelargonic acid, undecylenic acid, lauric acid, myristic acid, pentadecylic acid, palmitic acid, heptadecylic acid, stearic acid, nonadecanoic acid, arachidic acid, behenic acid, montanic acid, acrylic acid, crotonic acid, oleic acid, linoleic acid, linolenic acid and their mixtures. Aliphatic dicarboxylic acids include malonic acid, succinic acid, glutaric acid, adipic acid, pimelic acid, suberic acid, azelaic acid, sebacic acid, maleic acid, fumaric acid, itaconic acid, citraconic acid, mesaconic acid and glutaconic acid. Aromatic carboxylic acids include benzoic acid, toluic acid, phthalic acid, isophthalic acid, naphthalic acid and salicylic acid. Amino acids include glycine, $\alpha$-alanine, $\beta$-alanine, valine, isoleucine, phenylalanine, methionine, arginine, aspartic acid, citrulline, cystine, glutamic acid, histidine, hydroxyproline, lysine, ornithine, proline, serine, threonine, tryptophane, $\gamma$-aminobutyric acid, 6-aminocaproic acid and their mixtures. Hydroxycarboxylic acids include lactic acid, citric acid, tartaric acid and malic acid.

As derivatives of these carboxyl group-containing compounds, there may be employed N-acyl, N-alkyl or N-polyether derivatives of amino acids and of pyroglutamic acid, the $\omega$-monoester of $\alpha,\omega$-dicarboxyamino acids such as aspartic acid and glutamic acid, the partial ester or polyether derivatives of hydroxypolycarboxylic acids, the monoesters of aliphatic dicarboxylic acids and the monoesters of aromatic dicarboxylic acids.

The partial ester may be prepared by the well-known esterification of an alcohol, e.g. by direct esterification of a neopentyl type polyhydric alcohol and a carboxyl group-containing compound. An esterification catalyst such as sulfuric acid, p-toluenesulfonic acid or an alkali metal hydroxide may be employed. The esterification may be carried out in a suitable solvent which is capable of forming an azeotrope with water, such as toluene, benzene or xylene, whereby reaction water may be removed as an azeotrope as it is formed by distillation. In general, esterification may be carried out by heating a mixture of a neopentyl type polyhydric alcohol and a carboxyl group-containing compound at an elevated temperature e.g. 140°~250° C. until a partial ester is formed. The neopentyl type polyhydric alcohol is reacted with a carboxyl group-containing compound in amounts which provide from about 1.1 to 12 hydroxyl groups of said neopentyl type polyhydric alcohol per carboxyl group of said carboxyl group-containing compound.

When the neopentyl type polyhydric alcohol is employed in such amount as just mentioned in preparing its partial ester, the neopentyl type polyhydric alcohol remains partly unreacted in the reaction mixture. If desired, a partial ester may be isolated from the reaction mixture by extraction with a suitable solvent such as acetone, ethanol, benzene, toluene or mixture thereof. However, the reaction mixture, which consists of a partial ester and unreacted neopentyl type polyhydric alcohol, may be directly employed in the subsequent preparation of a molten material. For this purpose, the reaction mixture may be subjected to fractional distillation to remove solvent or unreacted volatile carboxylic acid, if present and then may be subjected to a melt treatment.

In a further preferred embodiment, a neopentyl type polyhydric alcohol may be reacted with a carboxyl group-containing compound under molten conditions in an amount which yields a molten product which is compatible with a halogen-containing resin. Namely, a partial ester may be prepared in a melt reaction in the absence of solvent, whereby the desired molten product is obtained at one stroke. In the case where a low boiling aliphatic monocarboxylic acid is employed, the melt reaction should be conducted in a closed system e.g. an autoclave under pressure.

The weight ratio of neopentyl type polyhydric alcohol to its partial ester in the molten mixture may be within the range of 1:9 to 9:1, preferably 1:3 to 3:1 in view of the good compatibility of the molten mixture with the halogen-containing resin. In fact, the greater the partial ester content, the lower the melting point of the resultant molten product.

The preferred stabilizer assistant is the molten material derived from a mixture of (A) a neopentyl type polyhydric alcohol and (B) a partial ester of said neopentyl type polyhydric alcohol and an amino acid or pyroglutamic acid, since the amino group of the amino acid or the imino group of pyroglutamic acid apparently increases the stabilizing effect of the zinc and alkaline earth metal stabilizers.

Examples of zinc and alkaline earth metal stabilizers whose thermal stabilizing effect is markedly increased in combination with the molten material of the present invention include the metal carbonates, oxides, hydroxides, and salts of mineral acids such as sulfuric acid or of an organic acid such as a fatty acid having 6 to 20 carbon atoms or naphthenic acid. Particularly, calcium-zinc salts and barium-zinc salts of fatty acids are the preferred stabilizers because of their low-toxicity. Of course, other known stabilizers such as organotin stabilizer (e.g. dibutyltin dilaurate, dibutyl tin distearate or butyl tin mercaptide) and lead stabilizer (e.g. lead stearate or tribasic lead sulfate) may be further employed, if desired.

Examples of halogen-containing resins which may be stabilized with the stabilizer composition comprising a zinc and/or alkaline earth metal stabilizer and a stabilizer assistant of the molten material defined herein include polyvinyl halides,: polyvinylidene halides of copolymers of a vinyl halide and a vinylidene halide, copolymers of a vinyl halide and ethylene, copolymers of a vinyl halide or a vinylidene halide with another unsaturated monomer copolymerizable therewith, for example, the vinyl esters of carboxylic acids such as vinyl acetate, vinyl propionate, vinyl butyrate and vinyl benzoate; esters of unsaturated acids such as methyl, ethyl, propyl, butyl and allyl esters of (methyl) acrylic acids; vinyl aromatic compounds such as styrene; esters of α,β-unsaturated carboxylic acids such as the methyl, ethyl, propyl and octyl esters of maleic, crotonic, itaconic and fumaric acids, halogenated polyolefins such as chlorinated polyethylene and chlorinated polypropylene, and polyolefins containing a very small amount of halogenide catalyst impurities. Preferably, the halides referred to in the present paragraph are chlorides.

In the compounding of the stabilized halogen-containing resins, a stabilizer of zinc and/or alkaline earth compound and stabilizer assistant of molten material defined herein are ordinarily incorporated in the halogen-containing resins together with the necessary plasticizers by suitable milling techniques, and then the resulting composition is processed at an elevated temperature, for example, within the range from 150° C. to 200° C. on hot rolls or in a heated mixer.

The amount of zinc and/or alkaline earth metal stabilizer used in the present invention may be 0.1 to 15 parts by weight, preferably 0.3 to 5 parts by weight per 100 parts of halogen-containing resin. Also, the amount of a molten material which may be employed as a stabilizer assistant in the present invention may be 0.05 to 10 parts by weight, preferably 0.1 to 3 parts by weight per 100 parts of the halogen-containing resin.

With the halogen-containing resins, there may be incorporated other additives for example plasticizers, epoxy stabilizer, organic chelates, pigments, fillers, blowing agents, anti-static agents, anti-clouding agents, plate out preventing agents, surface treating agents, lubricants, antioxidants, anti-flaming agents, light stabilizers and ultraviolet absorption agents.

The stabilized composition of this invention are useful in the manufacture of mouldings, extrusions, sheets, films, coatings and similar articles.

In the following Examples, which are further illustrative of the present invention, all parts referred to are by weight. Interspersed with the Examples are Controls included for comparative purposes.

EXAMPLE 1

136 Grams (1 mole) of pentaerythritol and 227 g of a mixed fatty acid consisting of 30% valeric acid, 55% caproic acid and 15% enanthic acid, percent being by weight were placed in a four necked flask equipped with a stirrer, a thermometer and a condenser and heated at 180°~200° C. for 20 hours while the formed water was removed.

The reaction product had an acid number of 10.4, a saponification value of 302.2, a hydroxyl value of 420.2 and an average degree of esterification of 1.6 and confirmed to be a partial ester of pentaerythritol and the mixed fatty acid as the result of measurement of its infrared spectrum.

10 Grams of the partial ester was mixed with 20 g of dipentaerythritol, and the mixture was heated at 220° C. for 20 minutes to give a clear viscous liquid, which solidified on cooling and was pulverized finely for preparation of molten sample No. 1.

EXAMPLES 2~3

A mixture of 254 g (1 mole) of dipentaerythritol, 240 g (4 moles) of acetic acid and 162 g (9 moles) of water was refluxed at 103° C. for 24 hours. After removal of water and unreacted acetic acid by distillation under reduced pressure (90 mmHg, 60°~90° C.), the reaction mixture was analyzed with a gas chromatography and confirmed to consist of the following ingredients.

| Composition I | wt % |
| --- | --- |
| Dipentaerythritol | 33 |
| Monoester of dipentaerythritol and acetic acid | 31 |
| Diester of dipentaerythritol and acetic acid | 20 |
| Triester of dipentaerythritol and acetic acid | 10 |
| Other ester | trace |

The above composition I was heated at 230° C. for 25 minutes to give a clear viscous liquid, which solidified on cooling. The solidified material was pulverized into fine particles for prepration of molten sample No. 2.

Also, 20 g of the above composition I was added to 100 ml of a mixed solvent of benzene and ethanol (1:1 by volume) and stirred vigorously for 30 minutes. The insoluble, unreacted dipentaerythritol was removed by suction filtration. After stripping the mixed solvent, there was obtained a composition II containing the following ingredients.

| Composition II | wt % |
| --- | --- |
| Dipentaerythritol | 1 |
| Monoester of dipentaerythritol and acetic acid | 46 |
| Diester of dipentaerythritol and acetic acid | 39 |
| Triester of dipentaerythritol and acetic acid | 14 |
| Other ester | trace |

10 Grams of composition II having an average degree of esterification of 1.7 was mixed with 15 g of pentaerythritol and the mixture was heated at 230° C. for 25 minutes to give a clear viscous liquid, which solidified on cooling and was pulverized finely for preparation of molten sample No. 3.

EXAMPLE 4

136 Grams (1 mole) of pentaerythritol was reacted with 146 g (1 mole) of adipic acid at 155°~165° C. for 2 hours while the water formed was removed. From gas chromatographic and infrared spectrum measurements, the reaction product was confirmed to be a partial ester of pentaerythritol and adipic acid. The product was a viscous pale yellow liquid, and had a saponification value of 407, an acid value of 76, a hydroxyl value of 334.

10 Grams of the reaction mixture was mixed with 10 g of dipentaerythritol and heated at 220° C. for 20 minutes to give a clear viscous liquid which solidified on cooling. The solidified material was finely pulverized for preparation of molten sample No. 4.

EXAMPLE 5

136 Grams (1 mole) of pentaerythritol was reacted with 147 g (1 mole) of glutamic acid at 180° C. for 6 hours while the water formed was removed. The reaction product was brown paste of a partial ester of pentaerythritol and pyroglutamic acid, and had a saponification value of 207, an acid value of 6 and a hydroxyl value of 692.

10 Grams of the reaction mixture was mixed with 10 g of tripentaerythritol and heated at 230° C. for 30 minutes to give a clear viscous liquid which solidified on cooling. The solidified material was finely pulverized for preparation of molten sample No. 5.

EXAMPLE 6

272 Grams (2 moles) of pentaerythritol was reacted with 150 g (1 mole) of tartaric acid at 175° C. for 2 hours while the formed water was removed.

The reaction product was waxy partial ester of pentaerythritol and tartaric acid which had a saponification value of 265, an acid number of 43 and a hydroxyl value of 1,230.

12 Grams of the reaction product was mixed with 8 g of pentaerythritol and heated at 220° C. for 15 minutes to give a clear viscous liquid which solidified on cooling. The solidified material was finely pulverized for preparation of molten sample No. 6.

EXAMPLE 7

This example indicates a direct preparation of molten sample No. 7 by melt reaction of dipentaerythritol and acetic acid.

A mixture of 25.4 g (0.1 mole) of dipentaerythritol and 6 g (0.1 mole) of acetic acid was placed in a 100 ml autoclave. After the air in the autoclave had been replaced by nitrogen, the mixture was heated at 230° C. for 1 hour. After removal of unreacted acetic acid by distillation, the reaction mixture had a saponification value of 179, an acid number of 11 and a hydroxyl value of 910 and was confirmed to be a mixture consisting of 42% unreacted dipentaerythritol, 41% monoacetate, 16% diacetate and 1% triacetate as the result of gas chromatographic measurement.

EXAMPLE 8

254 g (1 mole) of dipentaerythritol was reacted with 155 g (1.2 mole) of pyroglutamic acid at 180° C. for 6 hours while the formed water was removed. The reaction product has a saponification value of 167, an acid number of 12, and a hydroxyl value of 720.

10 Grams of the reaction product was mixed with 10 g of pentaerythritol and heated at 230° C. for 30 minutes to give a clear viscous liquid which solidified on cooling. The solidified material was finely pulverized for preparation of molten sample No. 8. The melting points of the molten sample Nos. 1 to 8 and other molten sample Nos. 9~19 prepared by the similar procedures as in preceding Examples are shown in Table 1.

Table 1

| Molten sample No. | Ingredients (ratio by weight) Polyhydric alcohol | Polyhydric alcohol ester | | Melting point (°C.) |
|---|---|---|---|---|
| 1 | PET 82) | Ester of PET and mixed fatty acid (A.D.E of 1.6) | (1) | 204 ~ 206 |
| 2 | DPET (3) | Ester of DPET and acetic acid (A.D.E of 1.7) | (7) | 195 ~ 197 |
| 3 | PET (3) | Ester of DPET and acetic acid (A.D.E of 1.7) | (2) | 185 ~ 187 |
| 4 | PET (1) | Ester of PET and adipic acid (A.D.E of 1.4) | (1) | 203 ~ 206 |
| 5 | TPET (!) | Ester of PET and pyroglutamic acid (A.D.E of 0.9) | (1) | 190 ~ 192 |
| 6 | PET (2) | Ester of PET and Tartaric acid (A.D.E of 0.9) | (3) | 186 ~ 187 |
| 7 | DPET (2) | Ester of DPET of acetic acid (A.D.E of 1.3) | (3) | 183 ~ 187 |
| 8 | PET (1) | Ester of PPET of pyroglutamic acid (A.D.E of 1.1) | (1) | 182 ~ 183 |
| 9 | TPET (1) | Ester of PET and acetic acid (A.D.E of 1.4) | (1) | 201 ~ 203 |
| 10 | PET (1) | Ester of DPET and acetic acid (A.D.E of 1.2) | (1) | 189 ~ 191 |
| 11 | DPET (2) | Ester of DPET and a mixed fatty acid* (A.D.E of 2.4) | (1) | 212 ~ 214 |
| 12 | TPET (2) | Ester of DPET and acetic acid (A.D.E of 1.9) | (1) | 219 ~ 221 |
| 13 | PET (3) | Ester of PET and propionic acid (A.D.E of 2.2) | (2) | 194 ~ 197 |
| 14 | DPET (1) | Ester of PET and caproic acid (A.D.E of 2.3) | (2) | 201 ~ 203 |
| 15 | DPET (2) | Ester of PET and caprylic acid (A.D.E of 1.9) | (1) | 214 ~ 217 |
| 16 | DPET (1) | Ester of PET and phthalic acid (A.D.E of 1.4) | (1) | 185 ~ 188 |
| 17 | DPET (1) | Ester of PET and N-acetylmethionine (A.D.E of 1.0) | (1) | 202 ~ 204 |
| 18 | PET (1) DPET (1) | Esther of DPET and pyroglutamic acid (A.D.E of 1.0) | (1) | 203 ~ 205 |
| 19 | DPET (1) | Ester of DPET and tartaric acid (A.D.E of 1.2) | (1) | 192 ~ 194 |

Note)
PET: pentaerythritol
DPET: dipentaerythritol
TPET: tripentaerythritol
A.D.E: average degree of esterification
*The mixed fatty acid employed consists of 28% enathic acid, 42% caprylic acid and 30% pelargonic acid The ester product of Example 8 having an average degree of esterifation of 1.1 which had been prepared from dipentaerythritol and pyroglutamic acid was mixed with pentaerythritol in the various proportion shown in table 2 and each of the mixtures was heated at 220° C. to give a clear and viscous liquid which solidified on cooling. The mixture was finely pulverized. The melting points of the respective molten samples are shown in Table 2.

Table 2

| Molten sample | Weight ratio PET | Ester of DPET and pyroglutamic acid | Melting point (°C.) |
|---|---|---|---|
| 8 | 1 | 1 | 182 ~ 183 |
| 20 | 1 | 2 | 179 ~ 181 |
| 21 | 1 | 3 | 171 ~ 173 |
| 22 | 2 | 1 | 191 ~ 192 |
| 23 | 3 | 1 | 193 ~ 194 |
|  |  | PET | 232 ~ 235 |

EXAMPLE 9

Table 3 below shows the results of thermal stability test and evaluation of compatibility conducted with a series of polyvinyl chloride samples stabilized with various stabilizer systems containing barium-zinc stabilizer and the molten sample.

The following standard formulation was used, part being by weight.

| | |
|---|---|
| Polyvinyl chloride "Geon 103" (trade name) | 100 parts |
| Plasticizer dioctyl phthalate | 50 |
| Barium stearate | 1.0 |
| Zinc stearate | 1.0 |
| Triphenyl phosphite | 0.5 |
| Molten sample | 1.0 |

The formulation for each sample was blended in a 2-roll mill heated to 160° C. and rolled into sheets having a thickness of 1 mm. The sheets were press polished at 160° C. for 10 minutes for evaluation of compatibility and then cut into 3 cm squares. One square of each sample was put on glass plate and heated in a forced draft oven at 180° C. for evaluation of its thermal stability. For comparison, a similar test was conducted with mixture sample which was not subjected to melt treatment or molten sample of dipentaerythritol-pentaerythritol (3:7 by weight) mixture (control sample No. 24) whose melting point is 188° C., instead of molten sample listed in Table 1.

The results obtained are shown in Table 4 where number of mixture sample is corresponding to that of molten sample in Table 1. Compatibility was evaluated by observation of each sample with the naked eye. Each sample was evaluated as good if the sample has the same appearance as that of the control sample which contained no molten sample, while it was evaluated as bad if the presence of fine particles in the sample were easily observed. Thermal stability was evaluated by treatment time at that time sample became black color.

Table 3

| Molten sample | Compatibility | Thermal stability |
|---|---|---|
| None | — | 40 minutes |
| No. 1 | good | 90 |
| No. 2 | " | 85 |
| No. 3 | " | 90 |
| No. 7 | " | 90 |
| No. 9 | " | 90 |
| No. 10 | " | 90 |
| No. 11 | " | 90 |
| No. 12 | " | 100 |
| No. 13 | " | 80 |
| No. 14 | " | 90 |
| No. 15 | " | 90 |

Table 4

| Mixture sample (not molten) | Compatibility | Thermal stability |
|---|---|---|
| No. 1 | bad | 65 minutes |
| No. 2 | " | 60 |
| No. 3 | " | 65 |
| No. 9 | " | 55 |
| No. 10 | " | 60 |
| No. 11 | " | 65 |
| No. 12 | " | 65 |
| No. 13 | " | 55 |
| No. 14 | " | 65 |
| No. 15 | " | 65 |
| No. 24 | " | 80 |

From the data in Tables 3 and 4, it is apparent that the molten samples of the present invention are more compatible with polyvinyl chloride and appreciably increase the thermal stability power of the divalent metal stabilizers.

EXAMPLE 10

A vinyl plastic composition containing the following ingredients was prepared and tested in the manner described in Example 9. The results are shown in the following Table 5.

| | |
|---|---|
| Polyvinyl chloride "Geon-103" | 100 parts |
| Plasticizer dioctyl phthalate | 50 |
| Barium stearate | 1.0 |
| Zinc stearate | 1.0 |
| Triphenylphosphite | 1.0 |
| Molten sample | 1.0 |

Also, control test was conducted by employing a mixture sample, which was not subjected to melt treatment, instead of molten samples listed in Table 1. The results are shown in Table 6.

Table 5

| Molten sample | Compatibility | Thermal stability |
|---|---|---|
| None | — | 45 minutes |
| No. 4 | good | 100 |
| No. 5 | " | 120 |
| No. 6 | " | 90 |
| No. 8 | " | 140 |
| No. 16 | " | 110 |
| No. 17 | " | 90 |
| No. 18 | " | 130 |
| No. 19 | " | 100 |
| No. 20 | " | 140 |
| No. 21 | " | 160 |
| No. 22 | " | 120 |
| No. 23 | " | 120 |

Table 6

| Mixture sample (not molten) | Compatibility | Thermal stability |
|---|---|---|
| No. 4 | bad | 80 minutes |
| No. 5 | " | 90 |
| No. 6 | " | 60 |
| No. 8 | " | 120 |
| No. 16 | " | 75 |
| No. 17 | " | 80 |
| No. 18 | " | 85 |
| No. 19 | " | 65 |
| No. 20 | " | 120 |
| No. 21 | " | 140 |
| No. 22 | " | 100 |
| No. 23 | " | 100 |

EXAMPLE 11

A vinyl plastic composition containing the following ingredients was prepared and tested in the manner described in Example 9. The results are shown in Table 7.

| Polyvinyl chloride "Geon-103" | 100 parts |
| --- | --- |
| Plasticizer dioctylphthalate | 50 |
| Calcium stearate | 1.0 |
| Zinc stearate | 1.0 |
| Phosphorous ester "Mark 1500" (trade name) | 1.0 |
| Molten sample No. 18 | 0.5 ~ 3.0 |

Table 7

| Amount added of molten sample No. 18 | Compatibility | Thermal stability |
| --- | --- | --- |
| 0.5 part | good | 60 minutes |
| 1.0 | " | 100 |
| 2.0 | " | 160 |
| 3.0 | " | 160 |

It is to be noted from data in Table 7 that molten sample has good compatibility with polyvinyl chloride irrespective of its added amount, and thermal stability is greatly improved as the amount added of molten sample is increased but addition of more than 2 parts of molten sample gives approximately constant thermal stability improvement.

What is claimed as new and intended to be secured by Letters Patent is:

1. A halogen-containing resin composition, comprising: a halogen-containing resin selected from the group consisting of polyvinyl chloride, polyvinylidine halide, copolymers of vinyl chloride and vinylidine chloride, copolymers of vinyl chloride and ethylene and copolymers of vinyl halide or vinylidine halide with vinyl esters of carboxylic acids, esters of unsaturated acids, vinyl aromatic compounds, esters of α, β-unsaturated carboxylic acids, halogenated polyolefins or polyolefins containing halogenide catalyst residues, a resin stabilizing amount of a divalent metal stabilizer compound selected from the group consisting of a zinc compound and an alkaline earth compound and a stabilizer assistant consisting of a premixed melt blend derived from a mixture of (A) a polyhydric alcohol selected from the group consisting of pentaerythritol, dipentaerythritol, tripentaerythritol and mixtures thereof and (B) a partial ester of said polyhydric alcohol and a carboxyl group-containing compound selected from the group consisting of aliphatic saturated or unsaturated monocarboxylic acids having 1 to 30 carbon atoms, aliphatic dicarboxylic acids having 3 to 16 carbon atoms, aromatic carboxylic acids, amino acids, pyroglutamic acid, hydroxy carboxylic acids having 2 to 10 carbon atoms, N-acyl, N-alkyl or N-polyether derivatives of said amino acids and said pyroglutamic acid and ω-monoesters of α, ω-dicarboxyamino acids, said acid partial ester having at least one free hydroxyl group in the molecule, wherein the weight ratio of said polyhydric alcohol to said partial ester ranges from 9:1 to 1:9.

2. The composition according to claim 1, wherein the stabilizer is present in an amount of from 0.1 to 15 parts by weight per 100 parts by weight of the halogen-containing resin and the stabilizer assistant is present in an amount of from 0.05 to 10 parts by weight per 100 parts by weight of the halogen-containing resin.

3. The composition according to claim 1, wherein said divalent metal compound is an oxide, hydroxide, carbonate, sulfate, or a salt of a fatty acid having 6 to 20 carbon atoms.

4. The composition according to claim 3, wherein said divalent metal compound is a salt of fatty acid having 6 to 20 carbon atoms.

5. The composition according to claim 4, wherein said salt of a fatty acid is a zinc or alkaline earth metal stearate.

6. The composition according to claim 1, wherein the molten material is pulverized into very fine particle.

7. The composition according to claim 1, wherein the molten material is prepared by heating a mixture of (A) a polyhydric alcohol and (B) a partial ester of said polyhydric alcohol at an elevated temperature until a clear viscous liquid is formed, cooling the liquid to solidify the same and pulverizing the solid material into very fine particles.

8. The composition according to claim 1, wherein the molten material is derived from a mixture of (A) a polyhydric alcohol and (B) a partial ester of said polyhydric alcohol and an aliphatic saturated or unsaturated monocarboxylic acid having 1 to 30 carbon atoms.

9. The composition according to claim 1, wherein said molten material is derived from a mixture of (A) polyhydric alcohol and (B) partial ester of said polyhydric alcohol and acetic acid.

10. The composition according to claim 1, wherein the molten material is derived from a mixture of (A) polyhydric alcohol and (B) a partial ester of said polyhydric alcohol and aliphatic dicarboxylic acid having 3 to 16 carbon atoms.

11. The composition according to claim 1, wherein the molten material is derived from a mixture of (A) a polyhydric alcohol and (B) a partial ester of said polyhydric alcohol and adipic acid.

12. The composition according to claim 1, wherein the molten material is derived from a mixture of (A) a polyhydric alcohol and (B) a partial ester of said polyhydric alcohol and an amino acid.

13. The composition according to claim 1, wherein the molten material is derived from a mixture of (A) a polyhydric alcohol and (B) a partial ester of said polyhydric alcohol and glutamic acid.

14. The composition according to claim 1, wherein the molten material is derived from a mixture of (A) a polyhydric alcohol and (B) a partial ester of said polyhydric alcohol and pyroglutamic acid.

15. The composition according to claim 1, wherein the halogen-containing resin is polyvinyl chloride, polyvinylidene chloride, a copolymer of vinyl chloride or vinylidene chloride with a copolymerizable unsaturated monomer, a chlorinated polyethylene or a chlorinated polypropylene.

* * * * *